United States Patent
Blug et al.

(10) Patent No.: US 7,443,555 B2
(45) Date of Patent: Oct. 28, 2008

(54) LASER SCANNER

(75) Inventors: Andreas Blug, Freiburg (DE); Claudia Baulig, Ihringen (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 233 days.

(21) Appl. No.: 11/470,558

(22) Filed: Sep. 6, 2006

(65) Prior Publication Data
US 2007/0058230 A1  Mar. 15, 2007

(30) Foreign Application Priority Data
Sep. 15, 2005  (DE) .................. 10 2005 043 931

(51) Int. Cl.
G02B 26/08  (2006.01)
(52) U.S. Cl. ................................. 359/196; 356/4.01
(58) Field of Classification Search .............. 359/196, 359/201, 203, 212, 214, 215; 356/4.01
See application file for complete search history.

(56) References Cited

U.S. PATENT DOCUMENTS 7,030,968 B2 *  4/2006  D'Aligny et al. ........... 356/5.01

2004/0222366 A1 *  11/2004  Frick ..................... 250/236

FOREIGN PATENT DOCUMENTS

DE          10216405 A1   10/2003

* cited by examiner

*Primary Examiner*—Euncha P Cherry
(74) *Attorney, Agent, or Firm*—Baker & Daniels LLP

(57) ABSTRACT

A laser scanner is provided with a transmission optic (20) whose laser pencil beam (18) is oriented coaxially with the axis of rotation (28) of a deflecting mirror (22, 24) and coaxially with the optical axis of the associated detector optic (58). The arrangement is such that light reflected by a distant measuring point (44) can be deflected by the deflecting mirror (22, 24) through the detector optic (58) to a signal detector. The output signal (70) of the signal detector can be evaluated to acquire data, particularly spatial coordinates. The transmission optic (20) is disposed in a shading cylinder (22) that is open to the deflecting mirror (24) and extends from the detector optic (58) coaxially with the axis of rotation (28) of the deflecting mirror (22, 24) into the vicinity of the deflecting mirror (22, 24), in order thereby to shade the detector object particularly against stray light that occurs when the laser pencil beam (18) impinges on the deflecting mirror (22, 24, 26).

20 Claims, 4 Drawing Sheets

LASER SCANNER

This application claims the benefit of German Patent Application Number 10 2005 043 931.4 filed Sep. 15, 2005, the complete disclosure of which is hereby expressly incorporated by reference.

BACKGROUND OF THE INVENTION

1. Field of the Invention

The invention concerns a laser scanner comprising a transmission optic whose laser pencil beam is oriented coaxially with the axis of rotation of a rotating deflecting mirror and coaxially with the optical axis of the associated detector optic, such that light reflected from a distant measuring point can be deflected by the deflecting mirror and through the detector optic to a signal detector whose output signal can be evaluated for purposes of data acquisition.

2. Related Art

Such a laser scanner is known from DE 102 16 405 A1 and can be used to generate a three-dimensional ambient image. To prevent the ingress of dirt, the known laser scanner is provided with a cover window having a tapered inner surface and a tapered outer surface. The reflections occasioned during the transit of the laser pencil beam are suppressed in the known device by a series of measures. In particular, undesirable stray light can be absorbed in an annular beam dump.

Proceeding from this prior art, the object underlying the invention is to create a laser scanner distinguished by very low optical crosstalk between the transmission optic and the detector optic.

SUMMARY OF THE INVENTION

This object is achieved according to the invention in that the transmission optic is disposed in a shading cylinder that is open to the deflecting mirror and extends from the region of the detector optic coaxially with the axis of rotation of the deflecting mirror into the vicinity of the deflecting mirror.

The shading cylinder creates a shading cone for stray light, particularly for stray light produced at the deflection mirror or diverted there in the direction of the detector optic.

The shading cylinder can be implemented as a nontransparent tubular element made of metal or plastic, whose end pointing away from the deflecting mirror is fastened in the detector optic.

The end surface and the inner surface of the shading cylinder are implemented as absorbing and/or rough, to obtain effective suppression of stray light. The cross-sectional area of the shading cylinder is preferably substantially smaller than that of the aperture area of the detector optic.

Since the wall of the shading cylinder in a preferred exemplary embodiment is located in the region of the perpendicularly incident received pencil beam, the shading cylinder can be provided with openings to let the received pencil beam through. The shading cylinder can also be formed by a plurality of aperture rings connected to one another in the axial direction by webs, the received pencil beam being able to pass unhindered between the aperture rings to the deflecting mirror before impinging on it. The surfaces of the aperture rings are implemented as absorbing.

In an exemplary embodiment of the invention, the laser scanner is provided, as a stray light sensor, with a signal detector which is disposed set back from the signal detector provided for signal acquisition at the focal point of the detector optic, and which is modeled on the stray light produced inside the housing of the laser scanner or at the exit window through which the transmitted pencil beam leaves the housing.

It is useful if the laser scanner has a cylindrical housing with a circumferential window for the transmitted and received pencil beams, the axis of rotation of the deflecting mirror being aligned with the housing and there being provided for the transmitted pencil beam an annular gap that extends between two absorbing disks whose outer margins project into the cylindrical window. The absorbing disks are provided in the central region with circular recesses for the rotating deflecting mirror.

The absorbing disks are preferably provided with a stray light suppressing surface on their inward sides facing the annular gap between them.

In a preferred exemplary embodiment, the laser scanner is provided with at least one stray light sensor operative to detect soiling of the window and disposed on at least one absorbing disk in the annular gap near the outer edge.

In a further preferred exemplary embodiment of the invention, the deflecting window comprises an absorbing strip as a stray light dump, disposed on the strip that can be impinged on by stray light from the annular gap.

The deflecting mirror of the laser scanner can be implemented as an interference mirror that deflects only light having the wavelength of the received pencil beam toward the detector optic with a maximal reflection factor.

A laser scanner according to the invention is described in more detail hereinafter with reference to the drawings. Therein:

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
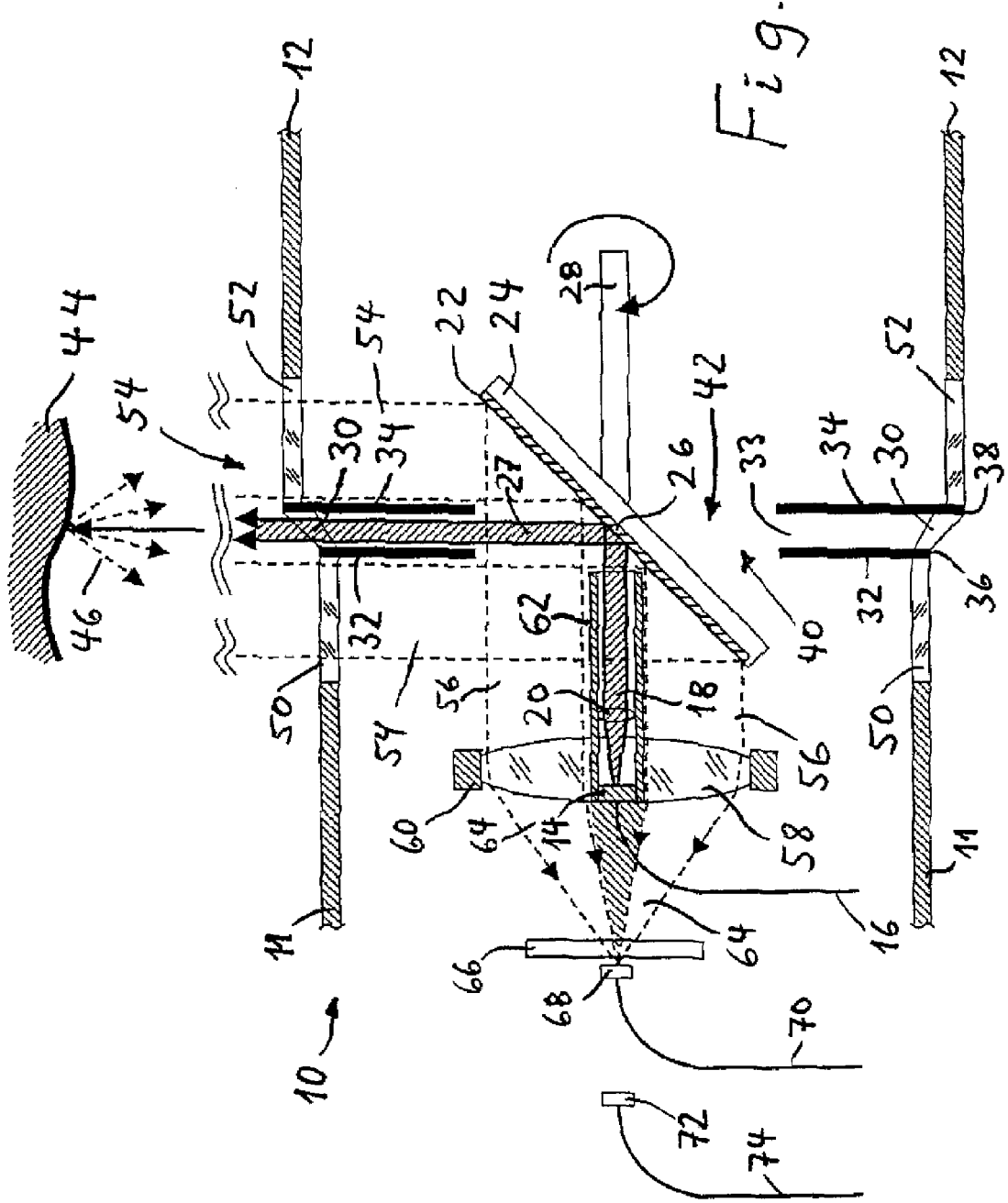
FIG. 1 shows the structure of the laser scanner in sectional view.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DESCRIPTION OF THE PRESENT INVENTION

The laser scanner depicted in FIG. 1 is provided with a cylindrical housing 10 comprising a first cylindrical housing section 11 and a second cylindrical housing section 12 of slightly larger diameter. The longitudinal axes of the two housing sections 11, 12 are aligned with each other and form an axis of symmetry for the cylindrical housing 10 and the substantially rotationally symmetrical structure of the laser scanner.

The laser scanner is provided with a laser 14 controlled via a control line 16. The transmitted pencil beam 18 exiting the laser 14 passes through a transmission optic 20 and then strikes the mirror surface 22 of an oval deflecting mirror 24.

Oval deflecting mirror 24, however, has a circular shape as viewed in plan in the direction of propagation of the transmitted pencil beam 18, said transmitted pencil beam 18 striking the mirror surface 22 in the region of the center point 26. When deflecting mirror 24 is in the position depicted in FIG. 1, the transmitted pencil beam 18 is deflected perpendicularly upwardly in FIG. 1, since deflecting mirror 24 forms a 45° angle with the longitudinal axis of transmitted pencil beam 18.

Deflecting mirror 24 is disposed on a rotating shaft 28 whose longitudinal axis extends through the center point 26 of deflecting mirror 24 and is aligned both with the longitudinal axes of housing sections 11 and 12 and with the longitudinal axis of transmitted pencil beam 18.

Due to the rotation of shaft 28, transmitted pencil beam 18 is deflected transversely to the longitudinal axis of housing 10 by means of deflecting mirror 24 and makes it possible to scan the environment with the deflected transmitted pencil beam 27 through an angle of 360°, along a line running perpendicular to the shaft 28.

As can be seen in FIG. 1, the deflected transmitted pencil beam 27 leaves housing 10 through a light-transparent conical window 30. To reduce stray light and reflections, neither the inner nor the outer surface of conical window 30 extends either parallel to the respective other surface or parallel to the axis of the housing. Conical window 30 is configured to be as narrow as possible in order to keep the stray light guiding areas as small as possible.

FIG. 1 additionally shows a first absorbing disk 32 and a second absorbing disk 34 located at a slight distance therefrom. Both absorbing disks 32, 34 extend by their outer margins 36, 38 to the outer side of housing sections 11 and 12, respectively, and thereby form in housing 10 an optical annular gap 33 for transmitted pencil beam 27. Each absorbing disk 32, 34 is provided at its center point with a circular opening 40, 42 to leave the necessary clearance around deflecting mirror 24 so that it can rotate.

After exiting housing 10 through circumferential conical window 30, the deflected transmitted pencil beam 27 strikes the object 44 to be measured, which is illustrated exemplarily in FIG. 1 and at a distance that is not true to scale. The laser scanner can thus be used to acquire data for distance measurements or other optical measurement processes. The object 44 to be measured generates according to its nature and its distance from the housing 10 of the laser scanner the object stray light 46 used for data acquisition, which is represented schematically in FIG. 1 by several dashed arrows.

Provided in the housing 10 of the laser scanner on both sides of conical window 30 and absorbing disks 32, 34 are transparent received beam windows 50 and 52 for the object stray light 46, which due to the cylindrical shape of the cylindrical housing sections 11, 12 are themselves also configured as sections of cylinders. The two received beam windows 50, 52 form a detection window through which the object stray light 46 returning from object 44 passes as a received pencil beam 54 into the inside of housing 10 and there impinges on the mirror surface 22 of rotating deflecting mirror 24 as a parallel received pencil beam 54, due to the large distance at which object 44 is located.

Due to the 45° angle of inclination of deflecting mirror 24 relative to the shaft 28, received pencil beam 54 is deflected leftward parallel to the longitudinal axis of the shaft 28, as illustrated in FIG. 1. The deflected received pencil beam 56 impinges on a detector optic 58, depicted in FIG. 1 as a collecting lens with a holder 60.

In the exemplary embodiment illustrated in FIG. 1, detector optic 58 is provided with a recess serving to receive the laser 14 and to fasten a shading cylinder 62 configured for example as a tubular element. The diameter of the shading cylinder 62 is so selected that the aperture loss of the detector optic 58 is as low as possible. The distance between the absorbing disks 32, 34 surrounding the annular gap 33, and thus the axial extent of conical window 30, are also selected so as to keep the aperture losses from the received pencil beam 54 as low as possible.

After passing through detector optic 58, the laser light returning from the object 44 to be measured travels as a convergent received pencil beam 64 through an optical transmission filter 66 to arrive at a signal detector 68 disposed at the center point of detector optic 58. Signal detector 68 is connected via a signal line 70 to an evaluation unit not shown in FIG. 1, which evaluates the output signal from signal detector 68 for purposes of data acquisition and particularly for distance measurement of the object 44 to be measured.

FIG. 1 further depicts a first stray light detector 72 with a stray light signal line 74. Stray light detector 72 is impinged on by stray light particularly when the detector optic 58 is exposed to light beams that are not incident as a parallel bundle of light rays and are therefore focused not on the signal detector 68 disposed at the focal point, but rather behind the focal point of the detector optic 58.

Figure 2:
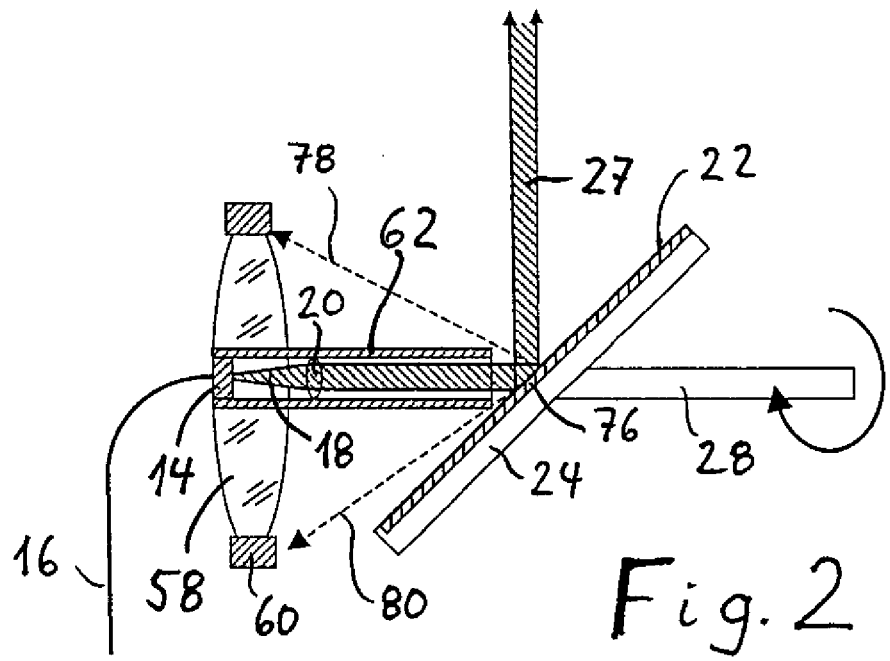
FIG. 2 shows essential components of the laser scanner in order to explain the operation of the shading tube as a stray light dump, in sectional view.

FIG. 2 illustrates some of the components shown in FIG. 1, in order to explain the operation of the shading tube 62 as a stray light dump for stray light produced by the transmitted pencil beam 18 when it strikes the impingement area 76 of the mirror surface 22 and is to be prevented from generating a signal in signal detector 68. If shading cylinder 62 were not present, stray light emanating from impingement area 76 within the spatial angles represented by boundary lines 78 and 80 in FIG. 2 would strike detector optic 58 and would therefore create an interference signal in signal detector 68. Shading cylinder 62, however, forms a stray light dump for the stray light reflected by impingement area 76 into the cone of space delimited by boundary lines 78 and 80.

Figure 3:
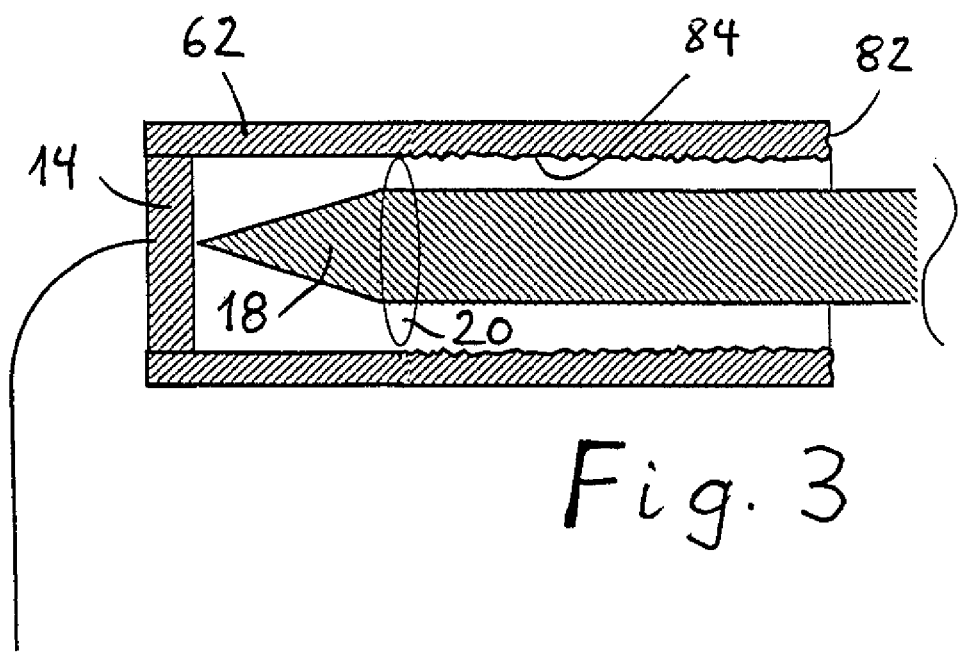
FIG. 3 shows the shading tube with the transmission optic and the laser in an enlarged section.

FIG. 3 is an enlarged depiction of shading cylinder 62, showing the annular front surface 82 and the cylindrical inner surface 84, both of which can be implemented as absorbing and/or rough in order to prevent the stray light emanating from the mirror surface 22 of deflecting mirror 24 from entering signal detector 68.

Based on FIG. 1, it will be appreciated that the front section of shading cylinder 62, i.e. that directed toward deflecting mirror 24, partially shades received pencil beam 54 and thereby reduces the size of the aperture for received pencil beam 54. Assuming that the walls of shading cylinder 62 are thick enough, this aperture degradation can be reduced by providing in the front region of shading cylinder 62 a plurality of slit-shaped openings that let through light that is incident transversely to the longitudinal axis of shading cylinder 62, but absorb non-transversely incident light at the lateral margins of the slit-shaped openings. Shading cylinder 62 can also be formed by a plurality of aperture rings connected to one another in the axial direction by webs.

Impingement area 76 can include a correcting element (not shown in the drawing) that corrects the astigmatism caused by the cylindrical shape of the window 30. In the simplest case, the correcting element is comprised of a small planar mirror that is tilted by a slight angle relative to mirror surface 22. Another option is to fashion mirror surface 22 as an aspherical mirror surface in the impingement area 76.

Stray light problems occur in a laser scanner of the kind depicted in FIG. 1 not only at the deflecting mirror 24, but also at the conical window 30 designed to prevent the ingress of dirt into the laser scanner. However, especially when the scanner is used outdoors or in dirty rooms, it is impossible to prevent dust particles, scratches, smears, water drops or condensate on the window 30 from forming stray light centers in the deflected transmitted pencil beam 27. This poses the risk of interfering stray light finding its way into the signal detector 68. Since the intensity of the transmitted pencil beam 27 is much higher than the intensity of the received pencil beam 54, even minuscule stray light fractions can negatively affect the evaluation of the object stray light 46 or actually render it impossible.

Figure 4:
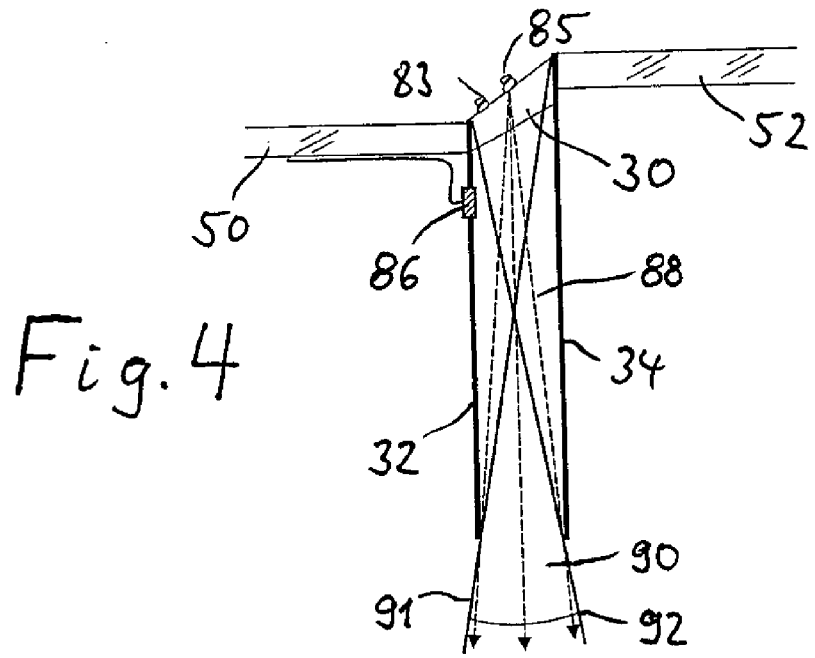
FIG. 4 shows an annular gap between two absorbing disks as stray light dumps.

Illustrated in FIG. 4 is conical window 30 with dust particles 83, 85 producing stray light. A second stray light detector 86 is disposed in the vicinity of window 30 in one of the absorbing disks 32, 34. The second stray light detector 86 is preferably located on the side of annular gap 33 that is not impinged on by the transmitted pencil beam 27 specularly reflected by window 30. Second stray light detector 86 serves to detect stray light coming from the region of conical window 30. If only one stray light detector 86 is provided, it is located in the region subject to the greatest risk of soiling. Instead of only one stray light detector 86 being disposed in the vicinity of the top surface of housing 10, a plurality of second stray light detectors 86 can also be provided along the circumferential conical window 30. If on evaluating the signals from one or more stray light detectors 86 a given stray light level is found to be exceeded, that signal can be used as an interference signal indicating that the measurements have become unreliable and the conical window 30 should be cleaned.

FIG. 4 represents the scattering angle range 88 of the stray light emanating from a dust particle 85 at the center of conical window 30 and not absorbed by the two absorbing disks 32 and 34. Since dust particles and other disturbances can occur anywhere on conical window 30, there are a great many scattering angle ranges analogous to scattering angle range 88 which together define an angular range 90 for stray light. This angular range 90 is delimited in FIG. 4 by lines 91 and 92.

Figure 5:
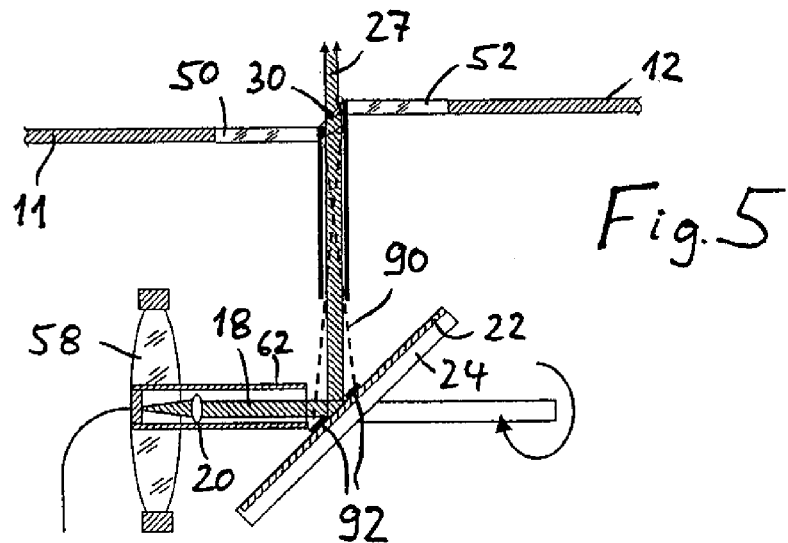
FIG. 5 is a diagram illustrating the maximum angular region of the stray light that can emanate from the tapered window serving as the transmitted beam window of the laser scanner.

The maximum angular range 90 of the stray light from conical window 30 serving as a transmitted beam window can also be seen in FIG. 5. In addition, FIG. 5 shows how the stray light assigned to angular range 90 falls on an absorbing strip 92 that serves as a stray light dump for the light scattered by window 30.

Figure 6:
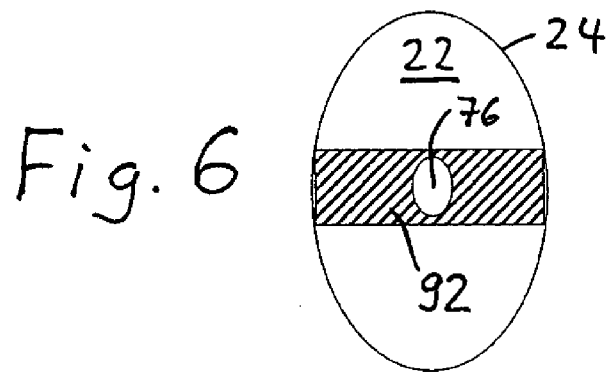
FIG. 6 is a plan view of the deflecting mirror of the laser scanner with an absorbing strip.

FIG. 6 shows a plan view of the absorbing strip 92 and the deflecting mirror 24. Absorbing strip 92 extends transversely across the oval mirror surface 22 of deflecting mirror 24, impingement area 76, however, not being occupied by absorbing strip 92.

Figure 7:
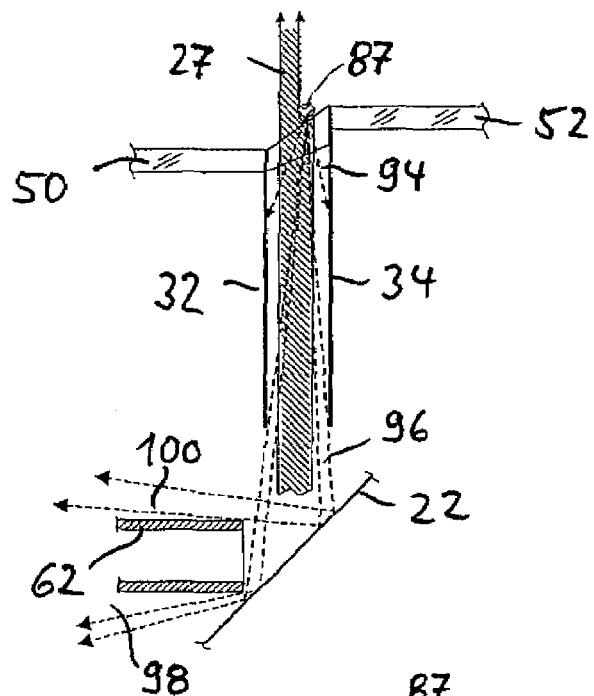
FIG. 7 is a diagram illustrating the stray light beam produced by a dust particle.

FIG. 7 shows a dust particle 87 whose stray light is partially captured by absorbing disks 32, 34 as stray light 94. An additional fraction of stray light 94 reaches mirror surface 22 as stray light beam 96 and, after being reflected by mirror surface 22, is partially captured by shading cylinder 62. Shading cylinder 62 thus creates a shaded region 98. The rest of stray light beam 100, whose edges are represented in FIG. 7 by broken lines, reaches detector optic 58. There, however, it is not focused into signal detector 68, but passes on to first stray light detector 72, whose stray light signal can be routed via stray light signal line 74 to an evaluation unit, which serves to detect the stray light produced in the region of conical window 30 and can also be used to trigger an error alarm.

Figure 8:
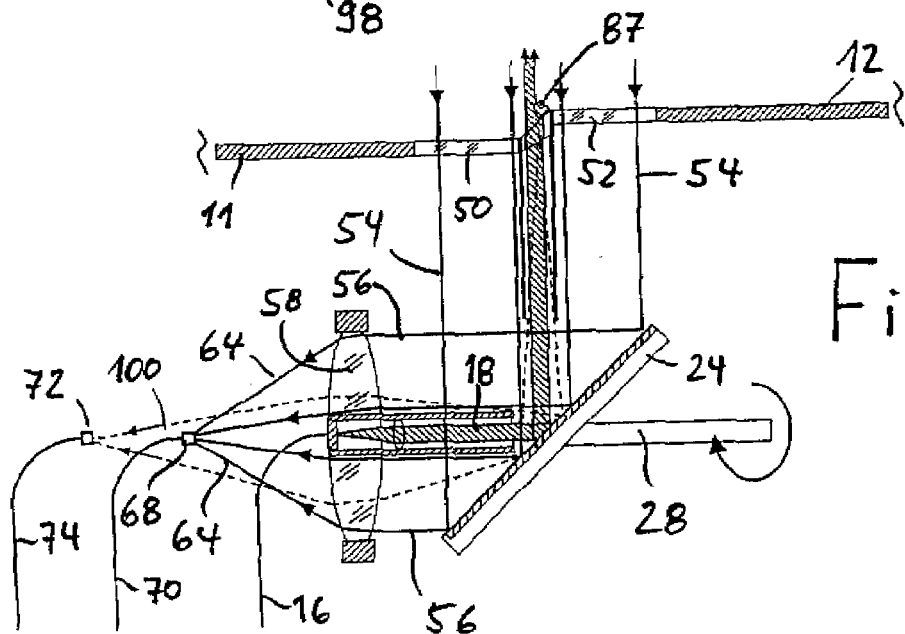
FIG. 8 is a diagram clarifying the beam path of the stray light striking a stray light detector behind the detector optic.

FIG. 8, by way of recapitulation, depicts the beam path of the received pencil beam 54, 56, 64 and the beam path of the stray light coming from a dust particle 87 and evaluated by means of first stray light detector 72.

Figure 9:
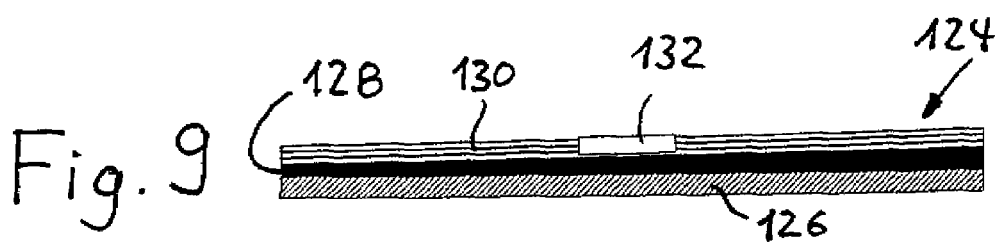
FIG. 9 shows a preferred exemplary embodiment of a wavelength-sensitive deflecting mirror.

According to an advantageous exemplary embodiment, the laser scanner is provided with a deflecting mirror 124, illustrated in section in FIG. 9, that also can be used as a substitute for the optical transmission filter 66 to help increase the signal to noise ratio. Deflecting mirror 124 has a wavelength-dependent reflection factor for received pencil beam 54 and deflects only the light that is to be fed to the signal detector 68 into the deflected received pencil beam 56. The wavelength-dependent reflection factor is preferably obtained by configuring deflecting mirror 124 as an interference mirror. To this end, an absorbing layer 128 on which an interference filter 130 is mounted is disposed on the substrate 126. The interference filter 130 on absorbing layer 128 is devised such that at the angle of incidence of the received pencil beam 54, it has its maximum reflection factor at the wavelength of the transmitted pencil beam 18.

An ordinary mirror surface 132 or also the aforementioned correcting element can be provided In the impingement area 76 of the transmitted pencil beam 18.

The laser scanner discussed above is provided with a plurality of stray light dumps, resulting in a high ratio between useful and interference signals. Far distant and relatively non-scattering objects can thus be measured precisely with low laser powers. The various stray light dumps particularly bring about an increase in range and accuracy in distance determinations. The need for cleaning can also be detected automatically and independently by the user. If the laser scanner is used for the contactless detection of other physical magnitudes and characteristics of objects, particular advantages are gained by virtue of the suppression of stray light in the optic of the laser scanner, due to the higher accuracy of the measurement values obtained.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A laser scanner comprising a transmission optic (20) whose laser pencil beam (18) is oriented coaxially with an axis of rotation (28) of a rotating deflecting mirror (22, 24) and coaxially with an optical axis of an associated detector optic (58) such that the light reflected by a distant measuring point (44) can be deflected by said deflecting mirror (22, 24) and through said detector optic (58) to a signal detector (68) whose output signal (70) can be evaluated for purposes of data acquisition, characterized in that said transmission optic (20) is disposed in a shading cylinder (62) that is open to said deflecting mirror (24) and that extends from the region of said detector optic (58) coaxially with the axis of rotation (28) of said deflecting mirror (22, 24) into the vicinity of said deflecting mirror (22, 24).

2. The laser scanner as in claim 1, characterized in that said shading cylinder (62) is implemented as a tubular element whose end pointing away from said deflecting mirror (22, 24) is fastened in said detector optic (58).

3. The laser scanner as in claim 1, characterized in that an end surface (82) and an inner surface (84) of said shading cylinder (62) are implemented as absorbing and/or rough.

4. The laser scanner of claim 1, characterized in that a cross-sectional area of said shading cylinder (62) is substantially smaller than that of an aperture area of said detector optic (58).

5. The laser scanner of claim 1, characterized in that a wall of said shading cylinder is provided with openings in the region of a perpendicularly incident received pencil beam (54) to let said received pencil beam (54) through.

6. The laser scanner of claim 1, characterized in that said laser scanner comprises as a stray light sensor a signal detector (72) that is disposed set back from the signal detector (68) provided for signal acquisition at the focal point of said detector optic (58), and is configured for the stray light (100) produced inside a housing (10) of said laser scanner or at an exit window (30) through which a transmitted pencil beam (27) leaves said housing (10).

7. The laser scanner of claim 1, characterized in that said laser scanner is provided with a cylindrical housing (10) comprising a circumferential cylindrical window (30, 50, 52) for a transmitted pencil beam (27) and a received pencil beam (54), the axis of rotation (28) of said deflecting mirror (22, 24) being aligned with the housing axis and there being provided for the transmitted pencil beam (27) an annular gap that extends between two absorbing disks (32, 34) whose outer margins (36, 38) project into said cylindrical window (30, 50, 52) and which are provided in a central region with circular recesses (40, 42) for said rotating deflecting mirror (22, 24).

8. The laser scanner as in claim 7, characterized in that said absorbing disks (32, 34) are provided with a stray light suppressing surface on their inward sides facing the annular gap between them.

9. The laser scanner as in claim 7, characterized in that at least one stray light sensor (86) for detecting soiling of said window (30) is provided on at least one absorbing disk (32, 34) in the annular gap near the outer edge (36, 38).

10. The laser scanner as in claim 7, characterized in that said deflecting mirror (22, 24) is provided with an absorbing strip (92) as a stray light dump, disposed on the strip that can be impinged on by stray light produced at said cylindrical window by said transmitted pencil beam.

11. The laser scanner of claim 1, characterized in that said deflecting mirror (22, 24) is implemented as an interference mirror that deflects only light having the wavelength of a received pencil beam (54) toward said detector optic (58) with a maximal reflection factor.

12. The laser scanner as in claim 2, characterized in that an end surface (82) and an inner surface (84) of said shading cylinder (62) are implemented as absorbing and/or rough.

13. The laser scanner of claim 12, characterized in that a cross-sectional area of said shading cylinder (62) is substantially smaller than that of an aperture area of said detector optic (58).

14. The laser scanner of claim 13, characterized in that a wall of said shading cylinder is provided with openings in the region of a perpendicularly incident received pencil beam (54) to let said received pencil beam (54) through.

15. The laser scanner of claim 14, characterized in that said laser scanner comprises as a stray light sensor a signal detector (72) that is disposed set back from the signal detector (68) provided for signal acquisition at the focal point of said detector optic (58), and is configured for the stray light (100) produced inside a housing (10) of said laser scanner or at an exit window (30) through which a transmitted pencil beam (27) leaves said housing (10).

16. The laser scanner of claim 13, characterized in that said laser scanner is provided with a cylindrical housing (10) comprising a circumferential cylindrical window (30, 50, 52) for a transmitted pencil beam (27) and a received pencil beam (54), the axis of rotation (28) of said deflecting mirror (22, 24) being aligned with the housing axis and there being provided for the transmitted pencil beam (27) an annular gap that extends between two absorbing disks (32, 34) whose outer margins (36, 38) project into said cylindrical window (30, 50, 52) and which are provided in a central region with circular recesses (40, 42) for said rotating deflecting mirror (22, 24).

17. The laser scanner as in claim 16, characterized in that said absorbing disks (32, 34) are provided with a stray light suppressing surface on their inward sides facing the annular gap between them.

18. The laser scanner as in claim 17, characterized in that at least one stray light sensor (86) for detecting soiling of said window (30) is provided on at least one absorbing disk (32, 34) in the annular gap near the outer edge (36, 38).

19. The laser scanner as in claim 18, characterized in that said deflecting mirror (22, 24) is provided with an absorbing strip (92) as a stray light dump, disposed on the strip that can be impinged on by stray light produced at said cylindrical window by said transmitted pencil beam.

20. The laser scanner of claim 19, characterized in that said deflecting mirror (22, 24) is implemented as an interference mirror that deflects only light having the wavelength of said received pencil beam (54) toward said detector optic (58) with a maximal reflection factor.

\* \* \* \* \*